(12) United States Patent
Patel et al.

(10) Patent No.: US 11,242,478 B2
(45) Date of Patent: Feb. 8, 2022

(54) CHARGED COMPOSITE MATERIALS, METHODS OF SYNTHESIZING, AND METHODS OF USE

(71) Applicant: Saudi Arabian Oil Company, Dhahran (SA)

(72) Inventors: Hasmukh A. Patel, Houston, TX (US); Ashok Santra, Woodlands, TX (US); Carl Thaemlitz, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 224 days.

(21) Appl. No.: 16/568,693

(22) Filed: Sep. 12, 2019

(65) Prior Publication Data

US 2020/0087559 A1    Mar. 19, 2020

Related U.S. Application Data

(60) Provisional application No. 62/730,990, filed on Sep. 13, 2018.

(51) Int. Cl.
| | |
|---|---|
| *C09K 8/12* | (2006.01) |
| *C09K 8/03* | (2006.01) |
| *C09K 8/035* | (2006.01) |

(52) U.S. Cl.
CPC ........... *C09K 8/12* (2013.01); *C09K 8/032* (2013.01); *C09K 8/035* (2013.01)

(58) Field of Classification Search
None
See application file for complete search history.

(56) References Cited

U.S. PATENT DOCUMENTS

| | | | |
|---|---|---|---|
| 4,830,843 A | 5/1989 | Usui et al. | |
| 7,244,797 B2 | 7/2007 | Kurihara et al. | |
| 8,142,752 B2 | 3/2012 | Kovanda et al. | |
| 8,202,501 B2 | 6/2012 | Martin et al. | |
| 9,175,161 B2 | 11/2015 | Aucejo Romero et al. | |
| 2013/0143988 A1* | 6/2013 | Aucejo Romero | C08K 9/04 524/236 |
| 2013/0177723 A1* | 7/2013 | Aucejo Romero | C08K 3/34 428/35.5 |

(Continued)

FOREIGN PATENT DOCUMENTS

KR    20160000287 A    1/2016

OTHER PUBLICATIONS

Second Examination Report dated Dec. 23, 2020 pertaining to GCC Application No. GC 2019-38272 filed Sep. 12, 2019.

(Continued)

*Primary Examiner* — John J Figueroa
(74) *Attorney, Agent, or Firm* — Dinsmore & Shohl LLP

(57) ABSTRACT

Embodiments of the present disclosure are directed to methods of producing charged composite materials. The method may include synthesizing a composite material and charging the composite material to produce a charged composite material. The composite material may include an inorganic composite component and an organic component. The organic component may include one or more primary or secondary amines. The organic component may be covalently bonded to the inorganic composite component. The charged composite material may be positively charged.

11 Claims, 3 Drawing Sheets

(56) References Cited

U.S. PATENT DOCUMENTS

| | | | |
|---|---|---|---|
| 2015/0047848 A1* | 2/2015 | Bestaoui-Spurr | C09K 8/5751 166/305.1 |
| 2015/0083415 A1* | 3/2015 | Monroe | E21B 43/267 166/276 |
| 2019/0055464 A1* | 2/2019 | Rediger | C09K 8/805 |

OTHER PUBLICATIONS

International Search Report and Written Opinion dated Nov. 15, 2019 pertaining to Application No. PCT/US2019/050746 filed Sep. 12, 2019.

Fujii et al. "Synthesis of an Alkylammonium/Magnesium Phyllosilicate Hybrid Nanocomposite Consisting of a Smectite-Like Layer and Organosiloxane Layers" Chem. Mater. 2003, 15, 1189-1197, 9 pgs.

Fujii et al. "Intercalation compounds of a synthetic alkylammonium-smectite with alkanolamines and their unique humidity response properties" Applied Clay Science 104 (2015) 88-95, 8 pgs.

Silva et al. "Layered Inorganic-Organic Talc-like Nanocomposites" Chem. Mater. 2002, 14, 175-179, 5 pgs.

Suter et al. "Rule based design of clay-swelling inhibitors" Energy & Environmental Science, Energy Environ. Sci., 2011, 4, 4572, 15 pgs.

Moscofian et al. "Stability of layered aluminum and magnesium organosilicates" Elsevier, Microporous and Mesoporous Materials 107 (2008) 113-120, 8 pgs.

Moura et al. "Physico-chemical of organo-functionalized magnesium phyllosilicate prepared by microwave heating" Microporous and Mesoporous Martials 190 (2014) 292-300, 9 pgs.

Moscofian et al. "Synthesized layered inorganic-organic magnesium organosilicate containing a disulfide moiety as a promising sorbent for cations removal" Journal of Hazardous Materials 160 (2008) 63-69, 7 pgs.

Burkett et al. "Synthesis, Characterization, and Reactivity of Layered Inorganic-Organic Nanocomposites Based on 2:1 Trioctahedral Phyllosilicates" Chem. Mater. 1997, 9, 1071-1073, 3 pgs.

International Search Report and Written Opinion dated Nov. 15, 2019 pertaining to Application No. PCT/US2019/049310 filed Sep. 3, 2019.

Patel et al. "Synthetic talc as a solid base catalyst for condensation of aldehydes and ketones" Journal of Molecular Catalysis A: Chemical 286 (2008) 31-40, 10 pgs.

Claverie et al. "Synthetic talc and talc-like structures: preparation, features and applications" Chemistry—A European Journal, Wiley-VCH Verlag, 2018, 24 (3), pp. 519-542. 27 pgs.

Office Action dated Jun. 7, 2021 pertaining to U.S. Appl. No. 16/558,772, filed Sep. 3, 2019, 26 pages.

Moura, K.O. et al., Comparative Adsorption of CO2 by mono-, Di-, and Triamino-Organofunctionalized Magnesium Phyllosilicates, Environ. Sci. Technol. 2013, 47, pp. 12201-12210.

* cited by examiner

CHARGED COMPOSITE MATERIALS, METHODS OF SYNTHESIZING, AND METHODS OF USE

CROSS-REFERENCE TO RELATED APPLICATIONS

This application claims priority to and incorporates by reference U.S. Provisional Application Ser. No. 62/730,990, filed Sep. 13, 2018.

TECHNICAL FIELD

Embodiments of the present disclosure generally relate to charged materials, and more specifically, to charged materials utilized in subterranean wellbore fluids.

BACKGROUND

Wellbore construction and production procedures may include drilling, completion, matrix stimulation, fracturing, or other wellbore construction and production enhancement procedures. Some wellbore formations may be composed of clay-based minerals. Some wellbore construction and production procedures may utilize aqueous wellbore fluids. In some cases, the water of the aqueous wellbore fluids may hydrate and swell the clay-based minerals. As such, some wellbore formations may become damaged by the water.

SUMMARY

As such, there are needs for clay stabilization compounds for use in wellbore fluids and other wellbore construction and production applications. Such clay stabilization compounds, which may also be referred to as "clay swelling inhibitors" or "shale inhibitors," may provide reduced swelling as compared with clay-based materials without clay stabilization compounds or conventional clay stabilization compounds.

Embodiments of the present disclosure meet those clay stabilization needs by providing charged composite materials. In some embodiments, the disclosed clay swelling inhibitors may be utilized in fluids used for wellbore applications. In some embodiments, the charged composite materials may be utilized to at least partially prevent clay-based materials from swelling during wellbore construction and production enhancement operations. In further embodiments, the disclosed clay swelling inhibitors may be utilized in partially-aqueous and non-aqueous fluids that comprise water soluble or dispersible materials.

According to at least one embodiment of the present disclosure, a method of producing a charged composite material is provided. The method may include synthesizing a composite material and charging the composite material to produce a charged composite material. The composite material may include a inorganic composite component and an organic component. The organic component may include one or more primary or secondary amines. The organic component may be covalently bonded to the inorganic component. The charged composite material may be positively charged.

According to at least another embodiment of the present disclosure, wellbore fluid is provided. The wellbore fluid may include an aqueous base fluid and a charged composite material. The charged composite material may include a inorganic composite component and an organic component. The inorganic composite component may include magnesium and silicon. The organic component may include primary or secondary amines. The organic component may be covalently bonded to the inorganic composite component.

According to at least one embodiment of the present disclosure, a charged composite material is provided. The charged composite material may include an inorganic composite component and an organic component. The inorganic composite component may include magnesium and silicon. The organic component may include one or more of primary or secondary amines. The composite material may be positively charged. The organic component may be covalently bonded to the inorganic composite component.

These and other embodiments are described in more detail in the following Detailed Description in conjunction with the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete and will fully convey the scope of the subject matter to those skilled in the art.

Generally, described in this disclosure are various embodiments of charged composite materials, methods of producing charged composite materials, and methods of utilizing charged composite materials.

Embodiments of the charged composite materials will now be described. In some embodiments, the charged composite materials may include a inorganic composite component and an organic component. The inorganic composite component may include magnesium and silicon. The organic component may include one or more of primary or secondary amines. The organic component may be covalently bonded to the inorganic composite component. The charged composite material may be positively charged.

As stated previously, in one or more embodiments, the inorganic composite component may include magnesium and silicon. In further embodiments, the inorganic composite component may include a layered magnesium silicate material, which may include one or more layers of materials comprising magnesium or silicon. In some embodiments, the magnesium present in the inorganic composite component may have an octahedral geometry. In some embodiments, the silicon present in the inorganic composite component may have a tetrahedral geometry.

Figure 1:
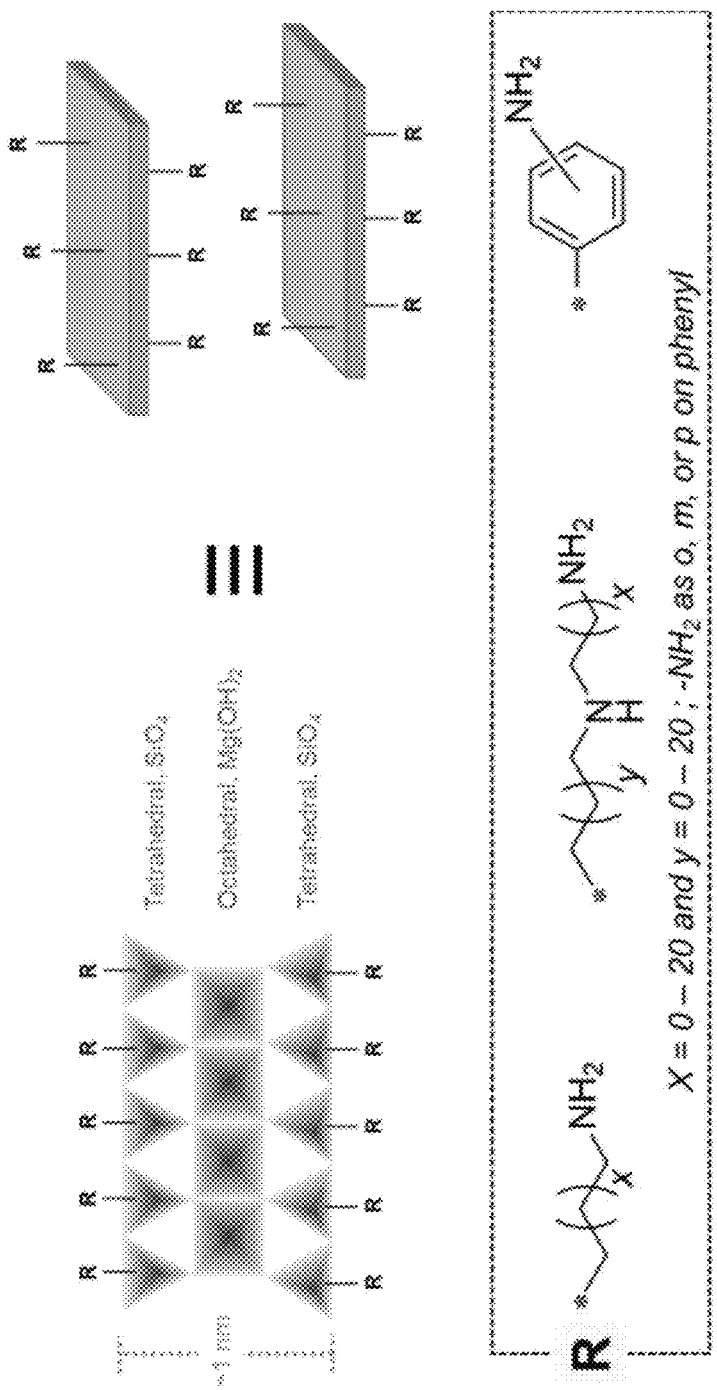
FIG. 1 is schematic depiction of composite materials, according to one or more embodiments of the present disclosure.

FIG. 1 shows an embodiment of the composite material (uncharged) that may include a layered magnesium silicate material. As shown in FIG. 1, in some embodiments, the magnesium may be present in an elongate inner layer. In further embodiments and as shown in FIG. 1, the magnesium may have an octahedral geometry and be present in an elongate inner layer. Referring still to FIG. 1, in some embodiments, the silicon may be present in a first silicon outer layer on one side of the elongate inner layer and a second silicon outer layer on the opposite side of the elongate inner layer. In further embodiments and as shown in FIG. 1, the silicon present in the first silicon outer layer, the second silicon outer layer, or both may have a tetrahedral geometry.

In some embodiments, the charged composite materials may have a thickness of from 1 nm to 5 nm. In other embodiments, the charged composite materials may have a thickness of from about 1 nm to about 4 nm, from about 1 nm to about 3 nm, from about 1 nm to about 2 nm, from about 2 nm to about 5 nm, from about 2 nm to about 4 nm, from about 2 nm to about 3 nm, from about 3 nm to about 5 nm, from about 3 nm to about 4 nm, or from about 5 nm to about 5 nm. In some embodiments, the charged composite materials may have a lateral dimension of from about 10 nm to about 2000 nm (2 microns), from about 50 nm to about 1000 nm, or from about 100 nm to about 500 nm. In embodiments, the overall thickness of the charged composite materials may depend on the length of the functional groups.

The magnesium of the inorganic composite component may be derived from a material that includes magnesium. In some embodiments, the material that includes magnesium may be a magnesium salt. In further embodiments, the magnesium salt may be magnesium chloride, magnesium nitrate, magnesium sulfate, or magnesium bromide. In some specific embodiments, the material that includes magnesium may include magnesium chloride hexahydrate. In other embodiments, the material that includes magnesium may include magnesium oxide or magnesium hydroxide.

In some embodiments, the material that includes magnesium may be naturally-occurring. For example, in some embodiments, magnesium hydroxide may be obtained from a naturally-occurring mineral, such as brucite. In other embodiments, the naturally-occurring material that includes magnesium may include magnesium-rich bittern brine, which may be a byproduct of sodium chloride production from sea water.

The silicon of the inorganic layer may be derived from a material that includes silicon. In some embodiments, the silicon source may include a silane or an organosilane. In further embodiments, the organosilane may include an alkoxy, for example, a trimethoxy or triethoxy derivative. In some embodiments, the silane or organosilane may include one or more of aminopropyltriethoxysilane, 3-(aminophenoxy)propyltriethoxysilane, N-(2-aminoethyl)-3-aminopropyltrimethoxysilane, (3-aminopropyl)trimethoxysilane, 11-Aminoundecyltrimethoxysilane, N-(6-aminohexyl)aminomethyltrimethoxysilane, and N-(2-aminoethyl)-11-aminoundecyltrimethoxysilane.

In some embodiments, the inorganic composite component may have a silicon to magnesium ratio of from about 0.7:1 to 1.5:1 or from 1:1 to about 1.4:1 by mole. In further embodiments, the silicon to magnesium ratio may be about 1.33 by mole. Without being bound by theory, it is believed that the silicon to magnesium ratio may affect the crystallinity of the charged composite material. When the silicon to magnesium ratio is from about more or less than 1.33:1 by mole, the inorganic composite component may include an amorphous material that includes one or more of magnesium hydroxide, magnesium oxide, silica materials, and layered magnesium silicates. It is believed that when the silicon to magnesium ratio is at about 1.33:1 by mole, the inorganic composite component may include a high purity of layered magnesium silicates. As used in the present disclosure, "high purity" means that the inorganic composite component may have at least 50 weight percent (wt. %), 75 wt. %, 90 wt. %, 95 wt. %, or 99 wt. % layered magnesium silicates based on the total weight of the inorganic composite component. Some applications may prefer a charged composite material with a inorganic composite component with a high purity of layered magnesium silicates. However, some applications may require another purity of layered magnesium silicates.

In some embodiments, the inorganic composite component may have a thickness of from 1 nanometer (nm) to 5 nm. In other embodiments, the inorganic composite component may have a thickness of from about 1 nm to about 4 nm, from about 1 nm to about 3 nm, from about 1 nm to about 2 nm, from about 2 nm to about 5 nm, from about 2 nm to about 4 nm, from about 2 nm to about 3 nm, from about 3 nm to about 5 nm, from about 3 nm to about 4 nm, or from about 5 nm to about 5 nm. In some embodiments, the inorganic composite component may have a lateral dimension of from about 10 nm to about 1000 nm, from about 50 nm to about 500 nm, or from about 100 nm to about 200 nm.

As stated previously, in embodiments, the composite material may also include an organic component. Referring again to FIG. 1, in some embodiments, the organic component may include one or more organic functional groups including primary or secondary amines, which are represented as R in FIG. 1. In further embodiments, the primary or secondary amines may include one or more alkyl or aryl amine moieties.

As stated previously, in some embodiments, the organic component may be covalently bonded to the silicon atoms of the inorganic composite component.

As stated previously, the charged composite materials may be charged. In some embodiments, the charged composite material may be positively charged. Without being bound by theory, the cationic positive charges on the charged composite materials may attach the charged composite material to the surface of the net-negatively charged particles. For example, net-negatively charged particles may include clay-based material particles, as described subsequently in this disclosure.

Methods of producing a charged composite material will now be described. According to at least one embodiment of the present disclosure, the method may include synthesizing a composite material and charging the composite material to produce the charged composite material.

As stated previously, in some embodiments, the composite material may include an inorganic composite component including magnesium and silicon. For example, the methodology of synthesizing the composite material may be summarized by the schematic depiction of FIG. 1 and the following reaction (1), where CM-N represents the neutral composite material, in shorthand:

$$MgCl_2 \cdot 6H_2O + H_2N(CH_2)_3Si(OC_2H_5)_3 \rightarrow CM\text{-}N \quad (1)$$

In some embodiments, a material that includes magnesium may be dissolved in a solvent to produce a solution. In further embodiments, the solvent may be ethanol. Next, the silicon source may be added to the solution. In some embodiments, an amine terminated silane may be a silicon source. The silicon source may be added at room temperature, or at a temperature of at least 10° C., at least 15° C., at least 20° C., at least 25° C., at least 30° C., or at least 35° C.

In some embodiments, the magnesium source and the silicon source are combined so that the silicon to magnesium ratio is from about 0.7:1 to 1.5:1 by mole or from 1:1 to about 1.4:1 by mole. In further embodiments, the silicon to magnesium ratio may be about 1.33:1 by mole.

In some embodiments, the pH of the solution may be maintained between a pH of 10 and 12. In some embodiments, the pH is maintained by adding a base to the solution. In further embodiments, the base is sodium hydroxide. In further embodiments, the base is added while stirring. In further embodiments, the base is added while stirring for about 30 minutes.

In other embodiments, the solution may then be further processed to produce a reaction mixture. Without being bound by theory, such further processing may increase the synthesis time and therefore influence the crystallinity of the composite material. Without being bound by theory, it is believed that during such processing steps, condensation of the tetrahedral layers (silicates) on the both sides of the octahedral layer (comprising magnesium) may facilitate relatively higher packing of the layers, which may result in higher crystallinity. For example, further processing may include stirring. In some embodiments, the solution may be stirred for about 3 to about 4 hours. In other embodiments, the solution may be refluxed. In some embodiments, the solution may be refluxed for at least 1 day, at least 2 days, or from about 1 day to about 2 days. The solution may be refluxed for at least 3 days or from about 3 days to about 15 days. In other embodiments, the solution may be cooled, filtered, and centrifuged to then produce the reaction mixture. The crystallinity of the composite material may be increased by reacting the solution under hydrothermal conditions. The hydrothermal reaction of the reaction mixture under a closed system (for example, at pressures higher than atmospheric pressure) may allow for relatively higher packing of the inorganic composite component, which may result in a relatively higher crystallinity of the composite material. In other embodiments, the crystallinity of the composite material may be increased by reacting the solution under microwave conditions.

In some embodiments, the reaction mixture may be washed. For example, the reaction mixture may be washed with deionized water. In some embodiments, the reaction mixture may be washed with deionized water more than once, for example, three times.

In other embodiments, the reaction mixture may be dried to produce the composite material. In some embodiments, the reaction mixture is dried at a temperature of at least 50° C., at least 60° C., at least 70° C., or at least 80° C. In further embodiments, the reaction mixture may be dried under vacuum.

During the synthesis of the composite materials, the organic component (for example, the alkyl/aryl amine moiety) may become covalently linked to the silicon atoms of the inorganic component (for example, the first and second layers comprising silicon) during the synthesis reaction. Without being bound by theory, during synthesis, the alkoxy groups of the silanes or organosilanes may react on the both sides of the inner octahedral layer through a condensation reaction. The pendant alkyl/aryl amine moieties (for example, a fourth functionality of an organosilane) may thus become covalently linked with the inorganic components.

Figure 2:
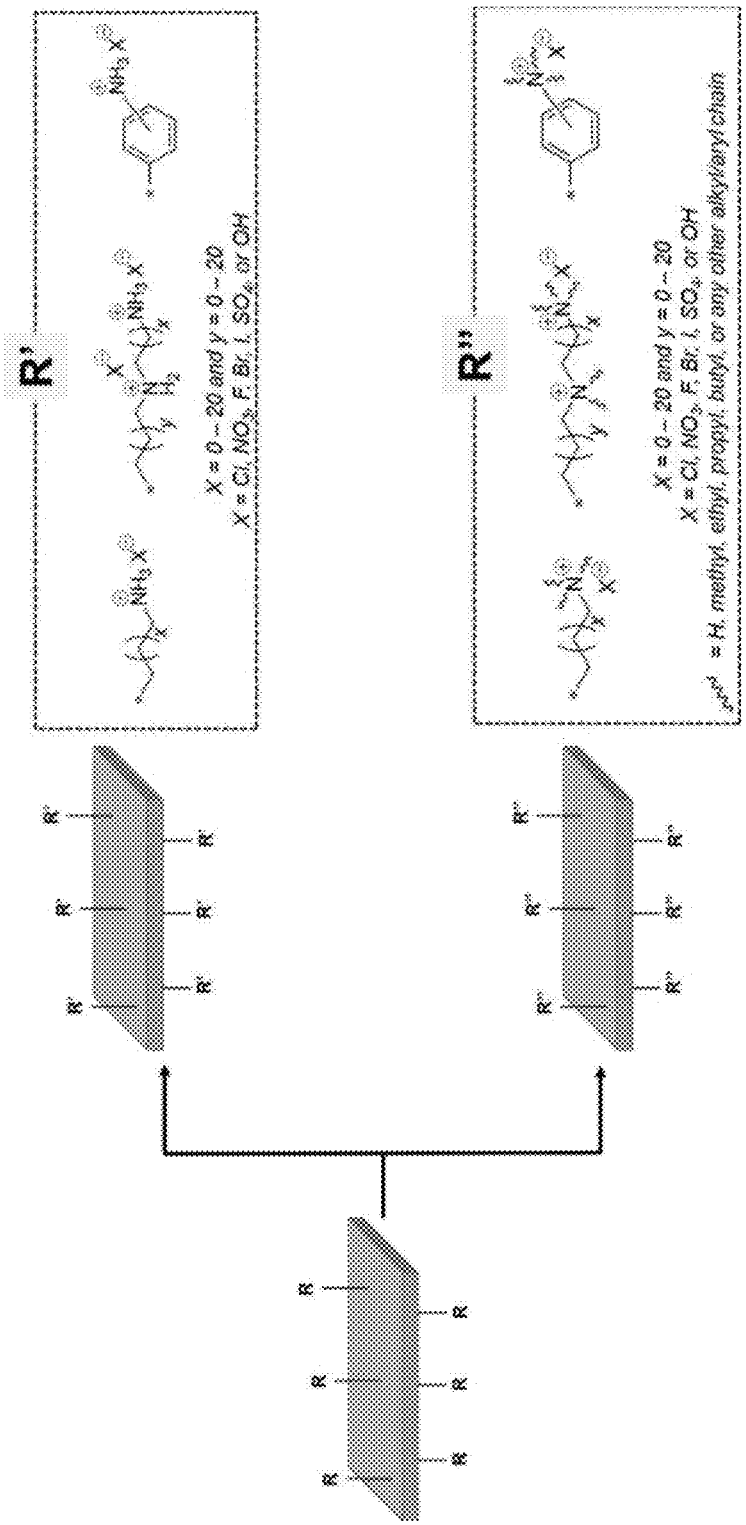
FIG. 2 is schematic depiction of charged composite materials, according to one or more embodiments of the present disclosure.

After synthesizing the composite material, the composite material may be charged to produce the charged composite material. The methodology of synthesizing the composite material may be summarized by FIG. 2 and the following reaction (2), where CM-N represents the neutral composite material, in shorthand, and CM-C represents the charged composite material, in shorthand. In further embodiments, the composite material may be charged by charging the organic component of the composite material. In further embodiments, the charged composite material may be positively charged.

$$CM\text{-}N \rightarrow CM\text{-}C \tag{2}$$

In some embodiments of producing the charged composite material, the composite material may be charged via quarternization of the primary or secondary amines of the organic component using a quarternization method. The quarternization method may include treating the composite material with a halogenated alkyl compound. In embodiments, the halogenated alkyl compound may be a compound of the formula RX, where R may include one or more alkyl or aryl groups and X may include one or more halogen or hydroxide groups. In some embodiments, the halogenated alkyl compound may be methyl iodide ($CH_3I$). The composite material may be mixed in a solvent. The solvent may include acetonitrile, methanol, ethanol, or other polar or nonpolar solvents. The amount of composite material to solvent ranges from about 1 wt. % to about 40 wt. % composite material per total volume of the solution, about 2 to about 20 wt. % composite material per volume of solution, or from about 5 wt. % to about 10 wt. % composite material per volume of solution. The amount of quaternizing compounds to composite material may be at a ratio from about 1 (composite material): 25 (quaternizing compounds), about 1:15, or about 1:10. The solution may be refluxed for about 10 hours to about 48 hours, from about 12 hours to about 30 hours, or for about 24 hours. The temperature of quarternization reaction may depend on the boiling points of the solvents used. The solution may be filtered and washed with solvents and dried to produce the charged composite material. In some embodiments, the drying may be at a temperature of at least 50° C., at least 60° C., at least 70° C., or at least 80° C. In some embodiments, the drying may be performed under vacuum. In some embodiments, drying may be from at about 10 hours to about 48 hours, from about 10 hours to about 24 hours, or from about 24 hours to about 48 hours.

In other embodiments of producing the charged composite material, the composite material may be charged by an acidification method. The acidification method may include acidifying the primary and secondary amines of the composite material with an acid solution that includes organic or inorganic acids. In some embodiments, the organic or inorganic acids may include HCl, $HNO_3$, $H_2SO_4$, HBr, HI, or HS. The amount of acid in aqueous solution may be from about 1 wt. % to about 20 wt. % acid based on the total volume of the solution, about 1 wt. % to about 10 wt. % acid per volume of solution, or from about 2 wt. % to about 5 wt. % acid per volume of solution. The amount of acid solution to composite material may be at a ratio from about 1 (composite material): 25 (acid solution), about 1:15, or about 1:10. The acidification reaction may be carried out at room temperature for about 2 hours to about 8 hours, about 2 hours to about 6 hours, about 2 hours to about 4 hours, about 4 hours to about 8 hours, about 4 hours to about 6 hours, or about 6 hours to about 8 hours. The acidification reaction mixture may be filtered or centrifuged to obtain precipitates. In some embodiments, the precipitates may be washed with deionized water. In some embodiments, the precipitates may be dried to produce the charged composite material. In some embodiments, the drying may be at a temperature of at least 50° C., at least 60° C., at least 70° C., or at least 80° C. In some embodiments, the drying may be performed under vacuum. In some embodiments, drying may be from at about 10 hours to about 48 hours, from about 10 hours to about 24 hours, or from about 24 hours to about 48 hours.

In other embodiments of producing the charged composite material, the composite material may be charged by a base treatment method. In some embodiments, the base treatment method may include treating the composite material with NaOH or KOH. The amount of base in aqueous solution may be from about 1 wt. % to about 20 wt. % base based on the total volume of the solution, about 1 wt. % to about 10 wt. % base per volume of solution, or from about 2 wt. % to about 5 wt. % base per volume of solution. The amount of base solution to composite material may be at a ratio from about 1 (composite material): 25 (base solution), about 1:15, or about 1:10. The base treatment reaction may be carried out at room temperature for about 5 minutes to 1 hour, about 2 hours to about 8 hours, about 2 hours to about 6 hours, about 2 hours to about 4 hours, about 4 hours to about 8 hours, about 4 hours to about 6 hours, or about 6 hours to about 8 hours. The base treatment reaction mixture may be filtered or centrifuged to obtain precipitates. In some embodiments, the precipitates may be dried to produce the charged composite material. In some embodiments, the drying may be at a temperature of at least 50° C., at least 60° C., at least 70° C., or at least 80° C. In some embodiments, the drying may be performed under vacuum. In some embodiments, drying may be from at about 10 hours to about 48 hours, from about 10 hours to about 24 hours, or from about 24 hours to about 48 hours.

Embodiments of subterranean wellbore fluids comprising charged composite materials will now be described. A subterranean wellbore fluid may include embodiments of the charged composite materials will now be described. The subterranean wellbore fluid may include an aqueous base fluid and embodiments of the presently-described charged composite material.

In some embodiments, the subterranean wellbore fluid may include an aqueous base fluid. The aqueous base fluid may include barite, bentonite, silica flour, polymers, viscosifiers, primary or secondary emulsifiers, fluid loss control additives, fluid stabilizers, loss circulation additives, metal salts, or combinations thereof. In embodiments, the aqueous base fluid of the subterranean wellbore fluid may include water.

Figure 3A:
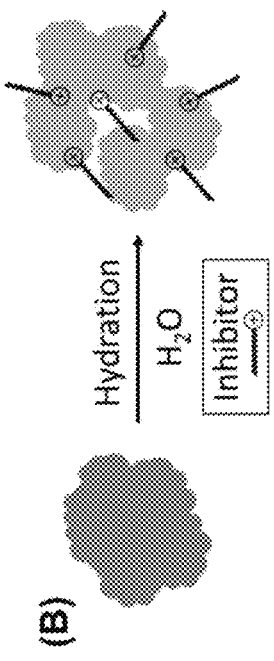
FIG. 3A is schematic depiction of the hydration of an exemplary clay with no inhibitor.
Figure 3B:
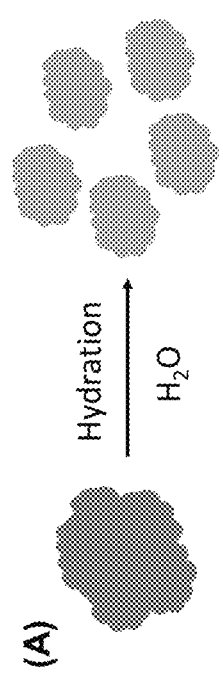
FIG. 3B is schematic depiction of the hydration of an exemplary clay with a conventional inhibitor comprising only organic cations.
Figure 3C:
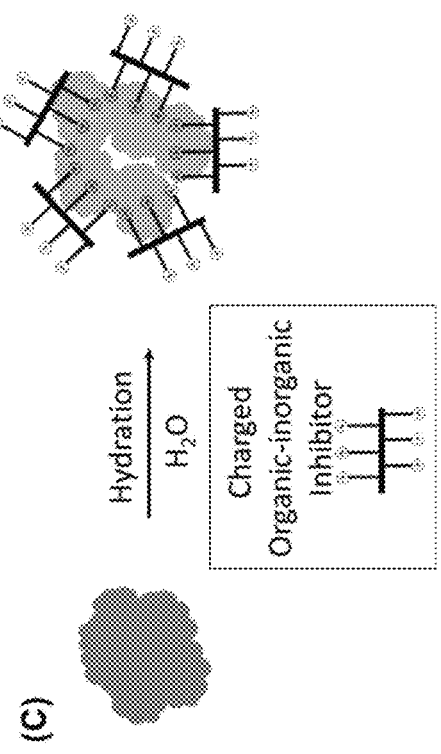
FIG. 3C is schematic depiction of the hydration of an exemplary clay with an inhibitor comprising charged composite materials, according to one or more embodiments of the present disclosure.

As stated previously in this disclosure, wellbore construction and production operations may utilize clay swelling inhibitors or shale inhibitors, which influence the operation and application of wellbore fluids. Referring now to FIGS. 3A-3C, without being bound by theory, it is believed that the charged organic component covalently attached to the inorganic composite component may allow the presently-disclosed charged composite material to interact with the clay to reduce or even eliminate the hydration of the clay (FIG. 3C). FIG. 3A shows a schematic depiction of the hydration of an exemplary clay with no inhibitor; FIG. 3B shows a schematic depiction of the hydration of an exemplary clay with a conventional inhibitor comprising only organic cations; and FIG. 3C shows a schematic depiction of the hydration of an exemplary clay with an inhibitor comprising charged composite materials, according to one or more embodiments of the present disclosure. As explained previously, the clay may include shale and have net-negatively charged particles. As such, the cationic positive charges on the charged composite materials may attach the charge composite material to the surface of the clay particles, which may prevent the clay particles from hydration and subsequent swelling.

Referring specifically to FIG. 3B, conventional clay swelling inhibitors may include only organic compounds. Such conventional inhibitors may not be environmentally friendly or hazardous to living organisms. Referring now to FIG. 3C, it is believed that the presence of the inorganic composite component of the presently-disclosed charged composite material may provide relatively stronger film formation, which provides additional coating strength when utilized in clay swelling applications as compared to wellbore fluids that only include organic materials, as shown in FIG. 3B. As such, the presently-disclosed charged composite materials, in which the amine functionalities are quaternized or ionized, may interact with clays to form a film that may inhibit the clay from swelling and provide improved results when compared to conventional clay swelling inhibitors which may include only organic compounds (FIG. 3B).

Without being bound by theory, higher crystallinity of the charged composite material may allow for relatively improved clay stabilization. In some embodiments, charged composite materials with relatively higher crystallinity may further protect clay particles from the swelling. Referring again to FIGS. 3A-3C, without being bound by theory, a composite material with a lower crystallinity may indicate a presence of disorder in the structure of the composite material. In some embodiments, water may penetrate through the disordered structure and may increase the swelling of the clay particles.

EXAMPLES

The following examples illustrate features of the present disclosure but are not intended to limit the scope of the disclosure. The following experiments compared the performance of wellbore fluids with varying inhibitor additives, some of which included examples of presently-described charged composite materials.

Comparative Example A—Using No Inhibitor

Comparative Example A was a sample of a wellbore fluid that did not include a swelling inhibitor additive. Comparative Example A was prepared by combining and mixing 250 g of water, 5.1 g of bentonite, and 24.9 g of silica flour. The components were mixed for 5 minutes. After mixing, the material was kept static for 15 minutes to produce Comparative Example A.

Comparative Example B—Using a Conventional Inhibitor

Comparative Example A was a sample of a wellbore fluid including a conventional swelling inhibitor additive. Comparative Example B was prepared by combining and mixing 250 g of water, 5.1 g of bentonite, 24.9 g of silica flour, and 2.5 g of commercially-available organic inhibitor additive, choline chloride. The components were mixed for 5 minutes.

After mixing, the material was kept static for 15 minutes to produce Comparative Example B.

Example 1—Using a Charged Composite Material Charged Via Quarternization

Example 1 was a sample of a wellbore fluid including an embodiment of the presently-described charged composite material charged via quarternization. First, the composite material was synthesized by preparing a solution by dissolving 10.0 grams (g) of magnesium chloride hexahydrate in 250 milliliters (mL) of ethanol. Then, 15.0 mL of aminopropyltriethoxysilane were added to the solution at room temperature while stirring. Next, with continuous stirring and over a period of 30 minutes (min), 1 normal (N) NaOH solution was added to the solution until the solution had a pH between 10 and 12 at room temperature. The reaction mixture was then continuously stirred at room temperature for approximately 3 to 4 hours, and refluxed for approximately 2 days. The reaction mixture was then cooled, filtered and centrifuged, washed with 100 mL of deionized water three times, and dried in a vacuum at 80° C. to obtain a white material, which was the composite material. The composite material was then charged using a quarternization method. The quaternization method included treating a sample of the composite material with methyl iodide ($CH_3I$). Then, 5.0 grams of composite material treated with methyl iodide was mixed in 50 mL acetonitrile. The solution was then refluxed for about 24 hours. The solution was then filtered and washed with more solvent and dried at 80° C. under vacuum for 24 hours to produce the charged composite material (via quartnerization). Then, 2.5 g of the charged composite material (via quartnerization) was combined and mixed with 250 g of water, 5.1 g of bentonite, and 24.9 g of silica flour. The components were mixed for 5 minutes. After mixing, the material was kept static for 15 minutes to produce Example 1.

Example 2—Using a Charged Composite Material Charged Via Acidification

Example 2 was a sample of a wellbore fluid including an embodiment of the presently-described charged composite material charged via acidification. First, the composite material was synthesized by preparing a solution by dissolving 10.0 grams (g) of magnesium chloride hexahydrate in 250 milliliters (mL) of ethanol. Then, 15.0 mL of aminopropyltriethoxysilane were added to the solution at room temperature while stirring. Next, with continuous stirring and over a period of 30 minutes (min), 1 normal (N) NaOH solution was added to the solution until the solution had a pH between 10 and 12 at room temperature. The reaction mixture was then continuously stirred at room temperature for approximately 3 to 4 hours, and refluxed for approximately 2 days. The reaction mixture was then cooled, filtered and centrifuged, washed with 100 mL of deionized water three times, and dried in a vacuum at 80° C. to obtain a white material, which was the composite material. The composite material was then charged via acidification. The acidification method included treating composite materials with hydrochloric acid 0.5 g of composite material dispersed in 12.5 mL distilled water and 7 mL of 1 N HCl aqueous solution was added (pH 7-8) with stirring at room temperature. The reaction mixture stirred for 5 hours and the product was separated by centrifugation and dried at 80° C. under vacuum for 24 hours to produce the charged composite material (via acidification). Then, 2.5 g of the charged composite material (via acidification) was combined and mixed with 250 g of water, 5.1 g of bentonite, and 24.9 g of silica flour. The components were mixed for 5 minutes. After mixing, the material was kept static for 15 minutes to produce Example 2.

Example 3—Using a Charged Composite Material Charged Via Base Treatment

Example 3 was a sample of a wellbore fluid including an embodiment of the presently-described charged composite material charged via base treatment. First, the composite material was synthesized by preparing a solution by dissolving 10.0 grams (g) of magnesium chloride hexahydrate in 250 milliliters (mL) of ethanol. Then, 15.0 mL of aminopropyltriethoxysilane were added to the solution at room temperature while stirring. Next, with continuous stirring and over a period of 30 minutes (min), 1 normal (N) NaOH solution was added to the solution until the solution had a pH between 10 and 12 at room temperature. The reaction mixture was then continuously stirred at room temperature for approximately 3 to 4 hours, and refluxed for approximately 2 days. The reaction mixture was then cooled, filtered and centrifuged, washed with 100 mL of deionized water three times, and dried in a vacuum at 80° C. to obtain a white material, which was the composite material. The composite material was then charged via a base treatment method. The composite material treated with sodium hydroxide in base treatment method. 0.5 g of composite material dispersed in 17.5 mL distilled water and 2 mL of 1 N NaOH aqueous solution was added (pH 11 to 12) with stirring at room temperature. The reaction mixture stirred for 5 hours and the product was separated by centrifugation and dried at 80° C. under vacuum for 24 hours to produce the charged composite material (via base treatment). Then, 2.5 g of the charged composite material (via base treatment) was combined and mixed with 250 g of water, 5.1 g of bentonite, and 24.9 g of silica flour. The components were mixed for 5 minutes. After mixing, the material was kept static for 15 minutes to produce Example 3.

Effect of the Charged Composite Materials on Clay Swelling

To observe the effects of the disclosed composite materials as an inhibitor of swelling in clay materials, a Clay Swelling Test was performed using a Fann Capillary Suction Timer (CST). To perform the Clay Swelling Test, 5 mL of each of Comparative Example A, Comparative Example B, Example 2, and Example 3 were used. The rate of water passing through filter paper via capillary suction using the Suction Timer was recorded. The normalized results from the Clay Swelling Tests are provided in Table 1.

TABLE 1

Clay Swelling Test Results for Example 2, Example 3, Comparative Example A, and Comparative Example B.

| Additive | Time Normalized (s) |
| --- | --- |
| Example 2 | 13.3 s |
| Example 3 | 12.9 s |
| Comparative Example A | 400.2 s |
| Comparative Example B | 12.3 s |

The results of the Clay Swelling Tests show that Example 2 and Example 3 exhibited superior anti-swelling properties when compared to Comparative Example A, which had no clay swelling inhibitor. Additionally, when compared to the conventional clay swelling inhibitor, Comparative Example B, Example 2 and Example 3 yielded essentially the same performance. As explained previously, clay swelling inhibitors or shale inhibitors used in wellbore fluids and other wellbore construction and production applications may be utilized to at least partially prevent clay-based materials from swelling during wellbore construction and production enhancement operations. Comparative Example A, which does not have any inhibitor showed a high rate of water passing through filter paper in CST test. Comparative Example B, which included choline chloride (a solely organic inhibitor), showed a lesser rate of water passing through filter paper; however, since choline chloride is considered hazardous to living organisms, Examples 2 and 3 showed improved results over Comparative Example B.

Comparative Example C—Using No Inhibitor

Comparative Example C was a sample of a shale/wellbore fluid mixture that did not include a swelling inhibitor additive. Shale was prepared from Pierre II Shale cuttings by breaking the cuttings into small pieces with a benchtop jaw crusher or manually with a hammer. The broken cuttings were then passed through a #4 size mesh screen (0.187 inches). The broken cuttings that passed through the #4 mesh screen were then passed over a #8 mesh screen (0.0937 inches). The broken cuttings that passed through the #8 mesh were disposed of, while 5 grams of the broken cuttings that were retained by the #8 mesh screen were mixed with 0.125 grams of xantham gum, and 58.3 grams of Synthetic Arabian Sea water [CaCl2 (1.71 g/L), MgCl2 (8.26 g/L), KCl (1.13 g/L), NaCl (41.72 g/L), NaHCO3 (0.21 g/L), Na2SO4 (6.12 g/L)] to produce Comparative Example C.

Comparative Example D—Using a Conventional Inhibitor

Comparative Example D was a sample of a shale/wellbore fluid mixture including a conventional swelling inhibitor additive. To prepare the sample, 5 grams of shale obtained as described previously in Comparative Example C, which were mixed with 0.125 grams of xantham gum, 0.5 g of commercially-available organic inhibitor additive choline chloride, and 58.3 grams of Synthetic Arabian Sea water [CaCl2 (1.71 g/L), MgCl2 (8.26 g/L), KCl (1.13 g/L), NaCl (41.72 g/L), NaHCO3 (0.21 g/L), Na2SO4 (6.12 g/L)] to produce Comparative Example D.

Example 4—Using a Charged Composite Material Charged Via Acidification

Example 4 was a sample of a shale/wellbore fluid mixture including an embodiment of the presently-described charged composite material charged via acidification. First, the composite material was synthesized by preparing a solution by dissolving 10.0 grams (g) of magnesium chloride hexahydrate in 250 milliliters (mL) of ethanol. Then, 15.0 mL of aminopropyltriethoxysilane were added to the solution at room temperature while stirring. Next, with continuous stirring and over a period of 30 minutes (min), 1 normal (N) NaOH solution was added to the solution until the solution had a pH between 10 and 12 at room temperature. The reaction mixture was then continuously stirred at room temperature for approximately 3 to 4 hours, and refluxed for approximately 2 days. The reaction mixture was then cooled, filtered and centrifuged, washed with 100 mL of deionized water three times, and dried in a vacuum at 80° C. to obtain a white material, which was the composite material. The composite material was then charged via acidification. The acidification method included treating composite materials with hydrochloric acid 0.5 g of composite material dispersed in 12.5 mL distilled water and 7 mL of 1 N HCl aqueous solution was added (pH 7-8) with stirring at room temperature. The reaction mixture stirred for 5 hours and the product was separated by centrifugation and dried at 80° C. under vacuum for 24 hours to produce the charged composite material (via acidification). To prepare the sample, 5 grams of shale obtained as described previously in Comparative Example C, which were mixed with 0.125 grams of xantham gum, 0.5 g of the charged composite material (via acidification), and 58.3 grams of Synthetic Arabian Sea water [CaCl2 (1.71 g/L), MgCl2 (8.26 g/L), KCl (1.13 g/L), NaCl (41.72 g/L), NaHCO3 (0.21 g/L), Na2SO4 (6.12 g/L)] to produce Example 4.

Example 5—Using a Charged Composite Material Charged Via Base Treatment

Example 5 was a sample of a shale/wellbore fluid mixture including an embodiment of the presently-described charged composite material charged via base treatment. First, the composite material was synthesized by preparing a solution by dissolving 10.0 grams (g) of magnesium chloride hexahydrate in 250 milliliters (mL) of ethanol. Then, 15.0 mL of aminopropyltriethoxysilane were added to the solution at room temperature while stirring. Next, with continuous stirring and over a period of 30 minutes (min), 1 normal (N) NaOH solution was added to the solution until the solution had a pH between 10 and 12 at room temperature. The reaction mixture was then continuously stirred at room temperature for approximately 3 to 4 hours, and refluxed for approximately 2 days. The reaction mixture was then cooled, filtered and centrifuged, washed with 100 mL of deionized water three times, and dried in a vacuum at 80° C. to obtain a white material, which was the composite material. The composite material was then charged via a base treatment method. The composite material treated with sodium hydroxide in base treatment method. 0.5 g of composite material dispersed in 17.5 mL distilled water and 2 mL of 1 N NaOH aqueous solution was added (pH 11 to 12) with stirring at room temperature. The reaction mixture stirred for 5 hours and the product was separated by centrifugation and dried at 80° C. under vacuum for 24 hours to produce the charged composite material (via base treatment). To prepare the sample, 5 grams of shale obtained as described previously in Comparative Example C, which were mixed with 0.125 grams of xantham gum, 0.5 g of the charged composite material (via base treatment), and 58.3 grams of Synthetic Arabian Sea water [CaCl2 (1.71 g/L), MgCl2 (8.26 g/L), KCl (1.13 g/L), NaCl (41.72 g/L), NaHCO3 (0.21 g/L), Na2SO4 (6.12 g/L)] to produce Example 5.

Effect of the Charged Composite Materials on Shale Dispersion

The effects of the charged composite materials were further analyzed using a Shale Dispersion Test. The Shale Dispersion Test was performed by hot rolling an amount of Comparative Example C, Comparative Example D, Example 4, and Example 5 each individually at 80° F. for 16 hours. After 16, hours, the dispersion was passed through #8 mesh to recover any shale that had not swelled. The amount of recovered shale recovered from the Shale Dispersion Test was calculated, and the results are provided in Table 2.

TABLE 2

Clay Swelling Test Results for Example 4, Example 5,
Comparative Example C, and Comparative Example D.

| Additive | Percent Shale Recovered (%) |
|---|---|
| Example 4 | 86.2% |
| Example 5 | 86.4% |
| Comparative Example C | 63.8% |
| Comparative Example D | 81.6% |

The results of the Shale Dispersion Test showed that the amount of shale recovered from the fluid with no inhibitor and the fluid with a conventional organic inhibitor (Comparative Examples C and D, respectively) are less than the fluids with the charged composite materials (Examples 4 and 5). The shale treated with the charged composite materials (Example 2 and 3) showed a greater shale recovery (approximately 86%), thereby indicating the least amount of clay swelling. Comparative Example D (choline chloride) showed the shale recovery of approximately 82%, thereby indicating more clay swelling, and Comparative Example C (with no inhibitor) demonstrated a poor recovery of shale (approximately 64%). It is believed that these results were from the formation of inorganic films around the shale particles, which reduced the hydration of the shale. It is believed that the reduced recovery of shales for Comparative Example C indicated water molecules hydrated the shale resulting in swelling and erosion of shale. As such, it is believed that embodiments of the charged composite materials provide improved results as clay swelling inhibitors compared to wellbore fluids with conventional inhibitors and fluids with no inhibitors.

The present disclosure includes one or more non-limiting aspects. A first aspect may include a method of producing a charged composite material, the method comprising: synthesizing a composite material, the composite material comprising a inorganic composite component and an organic component; and charging the composite material to produce a charged composite material. The organic component may comprise one or more primary or secondary amines; The organic component may be covalently bonded to the inorganic composite component. The charged composite material may be positively charged.

A second aspect may include the first aspect, further comprising synthesizing the composite material comprises combining a material comprising magnesium and a material comprising silicon.

A third aspect may include any of the preceding aspects, further comprising charging the composite material by acidification or by base treatment of the primary or secondary amines.

A fourth aspect may include any of the preceding aspects, further comprising charging the composite material by quarternization of the primary or secondary amines.

A fifth aspect may include any of the second through fourth aspects, where the siliane or organosilane comprises one or more of 3-(aminophenoxy)propyltriethoxysilane, N-(2-aminoethyl)-3-aminopropyltrimethoxysilane, (3-aminopropyl)trimethoxysilane, 11-Aminoundecyltrimethoxysilane, N-(6-aminohexyl)aminomethyltrimethoxysilane, or N-(2-aminoethyl)-11-aminoundecyltrimethoxysilane.

A sixth aspect may include a subterranean wellbore fluid comprising: an aqueous base fluid; a charged composite material comprising a inorganic composite component comprising magnesium and silicon; and an organic component chosen from primary and secondary amines. The organic component may be covalently bonded to the inorganic composite component.

A seventh aspect may include the sixth aspect, where the inorganic composite component comprises an inner octahedral layer comprising magnesium, a first tetrahedral outer layer comprising silicon on one side of the inner octahedral layer comprising magnesium, and a second tetrahedral outer layer comprising silicon on the opposite side of the inner octahedral layer comprising magnesium.

An eighth aspect may include any of the sixth through seventh aspects, where the composite material is positively charged.

A ninth aspect may include any of the sixth through eighth aspects, where the primary and secondary amines comprise alkyl or aryl primary and secondary amines.

A tenth aspect may include a charged composite material comprising: a inorganic composite component comprising magnesium and silicon, and an organic component comprising one or more primary or secondary amines. The composite material may be positively charged, and the organic component may be covalently bonded to the inorganic composite component.

An eleventh aspect may include the tenth aspect, where the magnesium is present in an octahedral layer.

A twelfth aspect may include any of the tenth through eleventh aspects, where the silicon is present in two tetrahedral layers.

A thirteenth aspect may include any of the tenth through twelfth aspects, where the magnesium component comprises one or more of 3-(aminophenoxy)propyltriethoxysilane, N-(2-aminoethyl)-3-aminopropyltrimethoxysilane, (3-aminopropyl)trimethoxysilane, 11-Aminoundecyltrimethoxysilane, N-(6-aminohexyl)aminomethyltrimethoxysilane, or N-(2-aminoethyl)-11-aminoundecyltrimethoxysilane.

A fourteenth aspect may include any of the tenth through thirteenth aspects, where the silicon to magnesium ratio is from 0.7:1 to 1.5:1.

A fifteenth aspect may include any of the tenth through fourteenth aspects, where the inorganic composite component has a thickness of from 1 nm to 5 nm and a lateral dimension of from 50 nm to 500 nm.

It will be apparent that modifications and variations are possible without departing from the scope of the disclosure defined in the appended claims. More specifically, although some aspects of the present disclosure are identified as preferred or particularly advantageous, it is contemplated that the present disclosure is not necessarily limited to these aspects.

What is claimed is:
1. A method of producing a charged composite material, the method comprising:
  synthesizing a composite material, the composite material comprising a inorganic composite component and an organic component; and
  charging the composite material to produce a charged composite material;
  where the organic component comprises one or more primary or secondary amines;
  where the organic component is covalently bonded to the inorganic composite component; and
  where the charged composite material is positively charged;
  where synthesizing the composite material comprises combining a material comprising magnesium and a material comprising silicon; and where the material comprising silicon comprises one or more of 3-(aminophenoxy)propyltriethoxysilane, N-(2-aminoethyl)-3-aminopropyltrimethoxysilane, (3-aminopropyl)trimethoxysilane, 11-Aminoundecyltrimethoxysilane, N-(6-aminohexyl)aminomethyltrimethoxysilane, or N-(2-aminoethyl)-11-aminoundecyltrimethoxysilane.

2. The method of claim 1, further comprising charging the composite material by acidification or by base treatment of the primary or secondary amines.

3. The method of claim 1, further comprising charging the composite material by quarternization of the primary or secondary amines.

4. A subterranean wellbore fluid comprising:
an aqueous base fluid; and
a charged composite material comprising
 a inorganic composite component comprising magnesium and silicon; and
 an organic component chosen from primary and secondary amines;
where the organic component is covalently bonded to the inorganic component; and
where the inorganic composite component comprises an inner octahedral layer comprising magnesium, a first tetrahedral outer layer comprising silicon on one side of the inner octahedral layer comprising magnesium, and a second tetrahedral outer layer comprising silicon on the opposite side of the inner octahedral layer comprising magnesium.

5. The subterranean wellbore fluid of claim 4, where the composite material is positively charged.

6. The subterranean wellbore fluid of claim 4, where the primary and secondary amines comprise alkyl or aryl primary and secondary amines.

7. A charged composite material comprising:
 a inorganic composite component comprising magnesium and silicon, and
 an organic component comprising one or more primary or secondary amines;
where the composite material is positively charged;
where the organic component is covalently bonded to the inorganic composite component; and
where the magnesium is present in an octahedral layer.

8. The charged composite material of claim 7, where the silicon is present in two tetrahedral layers.

9. The charged composite material of claim 7, where the magnesium component comprises one or more of 3-(aminophenoxy)propyltriethoxysilane, N-(2-aminoethyl)-3-aminopropyltrimethoxysilane, (3-aminopropyl)trimethoxysilane, 11-Aminoundecyltrimethoxysilane, N-(6-aminohexyl)aminomethyltrimethoxysilane, or N-(2-aminoethyl)-11-aminoundecyltrimethoxysilane.

10. The charged composite material of claim 7, where the silicon to magnesium ratio is from 0.7:1 to 1.5:1.

11. The charged composite material of claim 7, where the inorganic composite component has a thickness of from 1 nm to 5 nm and a lateral dimension of from 50 nm to 500 nm.

* * * * *